US007002815B2

(12) United States Patent
Scarlatescu (10) Patent No.: US 7,002,815 B2
(45) Date of Patent: *Feb. 21, 2006

(54) SWITCHING TYPE POWER CONVERTER CIRCUIT AND METHOD FOR USE THEREIN

(75) Inventor: Gabriel Scarlatescu, Bucharest (RO)

(73) Assignee: Oltronics, Inc., Lynn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/868,671

(22) Filed: Jun. 15, 2004

(65) Prior Publication Data

US 2005/0036340 A1 Feb. 17, 2005

Related U.S. Application Data

(63) Continuation of application No. 10/139,655, filed on May 2, 2002, now Pat. No. 6,807,073.

(60) Provisional application No. 60/288,047, filed on May 2, 2001.

(51) Int. Cl.
*H02J 3/00* (2006.01)

(52) U.S. Cl. ...................................... 363/34

(58) Field of Classification Search ................ 363/16, 363/20, 34, 37, 95, 97, 131
See application file for complete search history.

(56) References Cited

U.S. PATENT DOCUMENTS

| 4,541,040 | A | 9/1985 | Allfather |
| 4,720,668 | A | 1/1988 | Lee |
| 4,774,649 | A | 9/1988 | Archer |
| 4,796,173 | A | 1/1989 | Steigerwald |
| 4,816,982 | A | 3/1989 | Severinsky |
| 4,823,249 | A | 4/1989 | Garcia, II |
| 4,837,495 | A | 6/1989 | Zansky |
| 4,857,822 | A | 8/1989 | Tabisz et al. |
| 4,931,716 | A | 6/1990 | Jovanovic et al. |
| 4,940,929 | A | 7/1990 | Williams |
| 4,959,765 | A | 9/1990 | Weinberg |
| 5,057,986 | A | 10/1991 | Henze et al. |
| 5,073,849 | A | 12/1991 | Morris |
| 5,177,675 | A | 1/1993 | Archer |
| 5,231,563 | A | 7/1993 | Jitaru |
| 5,245,220 | A | 9/1993 | Lee |
| 5,268,830 | A | 12/1993 | Loftus, Jr. |
| 5,274,543 | A | 12/1993 | Loftus, Jr. |
| 5,317,494 | A | 5/1994 | Noro |
| 5,325,283 | A | 6/1994 | Farrington et al. |

(Continued)

FOREIGN PATENT DOCUMENTS

EP    1 096 653 A2    5/2001

(Continued)

OTHER PUBLICATIONS

*Digital Power Data Sheet, "eF175 Product Information Review", Apr. 3, 2001.

(Continued)

*Primary Examiner*—Matthew V. Nguyen
(74) *Attorney, Agent, or Firm*—Wolf, Greenfield & Sacks, P.C.

(57) ABSTRACT

A switching type power converter circuit includes a step-down converter circuit, a DC/AC converter circuit coupled to the step-down converter circuit, and a rectifier circuit coupled to the DC/AC converter circuit. In one embodiment, the DC/AC converter operates with near 50% duty cycle and with substantially zero-voltage, substantially minimum current switching in a resonant mode. An auxiliary step down converter may be added. An AC/DC converter front end with a full-wave bridge, an RF filter, and a power factor correction circuit may also be added.

1 Claim, 8 Drawing Sheets

U.S. PATENT DOCUMENTS

| | | | |
|---|---|---|---|
| 5,408,403 | A | 4/1995 | Nerone et al. |
| 5,410,467 | A | 4/1995 | Smith et al. |
| 5,434,768 | A | 7/1995 | Jitaru et al. |
| 5,438,498 | A | 8/1995 | Ingemi |
| 5,477,131 | A | 12/1995 | Gegner |
| 5,485,362 | A | 1/1996 | Archer |
| 5,500,576 | A | 3/1996 | Russell et al. |
| 5,563,775 | A | 10/1996 | Kammiller |
| 5,568,041 | A | 10/1996 | Hesterman |
| 5,594,629 | A | 1/1997 | Steigerwald |
| 5,594,635 | A | 1/1997 | Gegner |
| 5,604,669 | A | 2/1997 | Strong, III |
| 5,614,810 | A | 3/1997 | Nostwick et al. |
| 5,615,093 | A | 3/1997 | Nalbant |
| 5,646,835 | A | 7/1997 | Katcha |
| 5,680,301 | A | 10/1997 | Oughton, Jr. et al. |
| 5,694,304 | A | 12/1997 | Telefus et al. |
| 5,706,184 | A | 1/1998 | Mizuta et al. |
| 5,715,155 | A | 2/1998 | Shahani et al. |
| 5,751,150 | A * | 5/1998 | Rippel et al. ............... 324/537 |
| 5,767,591 | A * | 6/1998 | Pinkerton .................... 307/64 |
| 5,768,113 | A | 6/1998 | Safraoui |
| 5,774,351 | A | 6/1998 | Hsieh et al. |
| 5,880,940 | A | 3/1999 | Poon |
| 5,880,944 | A | 3/1999 | Hickman |
| 5,903,446 | A | 5/1999 | Huillet et al. |
| 5,909,362 | A | 6/1999 | Adams |
| 5,936,851 | A | 8/1999 | Hickman |
| 5,946,200 | A | 8/1999 | Kim et al. |
| 5,995,385 | A | 11/1999 | Shimamura |
| 5,999,433 | A | 12/1999 | Hua et al. |
| 6,008,630 | A | 12/1999 | Prasad |
| 6,011,703 | A | 1/2000 | Boylan et al. |
| 6,023,132 | A | 2/2000 | Crouse et al. |
| 6,043,993 | A | 3/2000 | Kobori et al. |
| 6,064,580 | A | 5/2000 | Watanabe et al. |
| 6,066,930 | A | 5/2000 | Horiguchi et al. |
| 6,087,782 | A | 7/2000 | Majid et al. |
| 6,091,615 | A | 7/2000 | Inoshita et al. |
| 6,130,825 | A | 10/2000 | Imamura et al. |
| 6,147,477 | A | 11/2000 | Saeki et al. |
| 6,147,881 | A | 11/2000 | Lau |
| 6,163,139 | A | 12/2000 | Symonds |
| 6,169,683 | B1 | 1/2001 | Farrington |
| 6,172,492 | B1 | 1/2001 | Pletcher et al. |
| 6,181,578 | B1 | 1/2001 | Fronk |
| 6,191,964 | B1 | 2/2001 | Boylan et al. |
| 6,201,714 | B1 | 3/2001 | Liang |
| 6,229,717 | B1 | 5/2001 | Corral Blanco et al. |
| 6,243,275 | B1 | 6/2001 | Ferencz |
| 6,246,594 | B1 | 6/2001 | Matsuda et al. |
| 6,246,599 | B1 | 6/2001 | Jang et al. |
| 6,278,621 | B1 | 8/2001 | Xia et al. |
| 6,295,215 | B1 * | 9/2001 | Faria et al. .................... 363/37 |
| 6,304,460 | B1 | 10/2001 | Cuk |
| 6,341,078 | B1 | 1/2002 | Miller |
| 6,344,979 | B1 | 2/2002 | Huang et al. |
| 6,349,044 | B1 | 2/2002 | Canales-Abarca et al. |
| 6,351,401 | B1 | 2/2002 | Scheel et al. |
| 6,359,793 | B1 | 3/2002 | Lee |
| 6,366,477 | B1 | 4/2002 | Navas Sabater et al. |
| 6,369,461 | B1 | 4/2002 | Jungreis et al. |
| 6,462,964 | B1 | 10/2002 | Porter et al. |
| 6,795,322 | B1 * | 9/2004 | Aihara et al. ................. 363/37 |

FOREIGN PATENT DOCUMENTS

| | | | |
|---|---|---|---|
| JP | 07 107743 A | | 4/1995 |
| JP | 11 146652 A | | 5/1999 |
| JP | 2002 078323 A | | 3/2002 |

OTHER PUBLICATIONS

*Digital Power Data Sheet, "eF306 Series Universal Input Power Factor Corrected 300 Watt Switchers", Jun. 18, 2002, pp. 1-2.

*EOS Corp. Data Sheet, "EOS V-Series Open-Frame Power Supplies, VLT130 Quad Output Series".

*EOS Corp. Data Sheet, "EOS V-Series Specifications, VLT130 Quad Output Series", Oct. 1999.

*Power-One Data Sheet, "MPB125 Series", Aug. 23, 2001, pp. 1-4.

*Andreycak, B., "Zero voltage switching resonant power conversion," Unitrode power supply design seminar manual, Seminar 700, pp. 3-329-3-555, Dec. 1990.

*Hudobiak, W.J., "Frequency and power limitations of class-D transistor amplifiers," *IEEE J Solid-State Circuits*, vol. SC-4, no. 1, pp. 25-37, Feb. 1969.

*Dixon, L.H., "Magnetics design for switching power supplies," synopsis of Unitrode Power Supply Seminars in 1997-2000 Seminar, (full text of seminar at: supporteti.com).

*El-Said, Mohamed A. H., "Analysis of tuned junction-transistor circuits under large sinusoidal voltages in the normal domain —part I: the effective hybrid-$\pi$ equivalent circuit," *IEEE Trans. Circuit History*, vol. CT-17, no. 1, pp. 8-12, Feb. 1970.

*El-Said, Mohamed A. H., "Analysis of tuned junction-transistor circuits under large sinusoidal voltages in the normal domain —part II: tuned power amplifiers and harmonic generators," *IEEE Trans. Circuit History*, vol. CT-17, no. 1, pp. 13-18, Feb. 1970.

*Furlan, J., "Preliminary analysis of the transistor tuned power amplifier," *Proc. IEEE (Correspondence)*, vol. 52, pp. 311, 1964.

*Harrison, R. G., "A nonlinear theory of class C transistor amplifiers and frequency multipliers," *IEEE J Solid-State Circuits*, vol. SC-2, no. 3, pp. 93-102, Sep. 1967.

*Henze, C. P., "Zero-voltage switching in high frequency power converters using pulse width modulation," APBC Record, pp. 33-40, Feb. 1-5, 1988.

*Jitaru, I.D., "Constant frequency, forward converter with resonant transition," High frequency power conversion 91 proceedings, pp. 282-292, Jun. 1991.

*Mammano, B., "Resonant mode converter topologies—additional topics," Unitrode power supply design seminar manual, Sem-700, pp. 6-1 to 6.6, Dec. 1990.

*Scott, T. M., "Tuned power amplifiers," *IEEE Trans. Circuit Theory*, vol. CT-11, no. 3, pp. 385-389, Sep. 1964.

* cited by examiner

SWITCHING TYPE POWER CONVERTER CIRCUIT AND METHOD FOR USE THEREIN

RELATED APPLICATIONS

This application is a continuation of application Ser. No. 10/139,655, filed on May 2, 2002, now U.S. Pat. No. 6,807,073, which claims the benefit of U.S. Provisional Patent Application Ser. No. 60/288,047, filed May 2, 2001. The entire contents of each application are hereby incorporated by reference.

FIELD OF THE INVENTION

The present invention relates to electronic power conversion circuits, and more specifically, to switching type power converter circuits.

BACKGROUND OF THE INVENTION

Many systems employ power converter circuits. These circuits receive electrical power in one form and convert it to another form, for example, to a form that is usable by electrical equipment employed within the particular system.

One type of power converter circuit is referred to as a switching type power converter circuit or simply a switching power supply. Switching type power converter circuits make use of switches, as well as capacitors, inductors and/or transformers, in order to convert the electrical power from one form to another. These switches have an on state and an off state. The on state is sometimes referred to as the closed state or the conducting state. The off state is sometimes referred to as the open state or the non-conducting state.

As with many power converter circuits, a switching type power converter circuit is often expected to operate with a particular level of efficiency and to provide a particular level of regulation over line and load changes.

The efficiency of a switching type converter circuit depends in part on the amount of power that is dissipated across the switches. The power loss across the switches is equal to the product of the voltage across the switch and the current through the switch. In this regard, the losses during the transitions from the on state to the off state, and vice versa, are often the main design concern. (When the switch is in the on state, the voltage across the switch is ideally zero. When the switch is in the off state, the current through the switch is zero.) Losses can occur during the transition from the on state to the off state, and vice versa, if there is a non-zero voltage across the switch and non-zero current through the switch. Such losses are proportional to the product of the power lost per transition and the switching frequency. Therefore, to reduce the losses across a switch, a zero-current condition is desired while the switch transitions from the on state to the off state, and a zero-voltage condition is desired while the switch transitions from the off state to the on state.

Several techniques have been introduced, which accomplish zero-voltage switching inherently at constant switching frequency. One of these techniques requires a full-bridge switching arrangement with four primary switches in which the regulation is accomplished by shift phase modulation. This technique has several drawbacks including the limited availability of phase-modulated integrated control circuits and the large number of parts, which include four primary switches, at least two secondary switches and at least two large magnetic circuit elements. The technique suffers from an inability to accomplish zero-voltage switching at light loads without additional circuit elements and additional complexity.

Another circuit to address this purpose is based on the single-ended forward converter that accomplishes zero-voltage switching by addition of an extra primary side switch and capacitor. Disadvantages of this converter include in additional voltage stress on the primary switching elements required to reset the transformer core. The parts required are two large magnetic circuit elements, the transformer and the filter inductor, two primary switches, a large primary capacitor, and two secondary switching elements.

There is one example of prior art that accomplishes a zero-voltage switching converter, which has a single magnetic circuit element, accomplishing both magnetic energy storage and isolation. This converter relies on high AC magnetizing fields in order to accomplish zero-voltage switching, requiring that the magnetizing field and the magnetizing current change sign during each cycle. However, these increased losses impose a limit on the level of power density and efficiency that can be obtained with this approach.

Notwithstanding the performance level of current switching type power converter circuits, further improvements are sought.

SUMMARY OF THE INVENTION

According to one aspect of the present invention, a power converter apparatus is provided. The power converter apparatus comprises a step-down converter circuit of switching type having an input port to couple to a supply voltage and having an output port to provide an output voltage at a magnitude that is lower than a magnitude of the supply voltage, and having a control circuit to receive a feedback signal and regulate the magnitude of the output voltage in response thereto; a DC/AC converter circuit of switching type having a primary side and a secondary side, the primary side having an input port coupled to the output port of the step-down converter circuit, the secondary side having an output port to provide an AC output voltage; a rectifier circuit having an input port and an output port, the input port being coupled to the secondary side of the DC/AC converter circuit, the output port supplying a DC voltage; and a feedback circuit to generate the feedback signal in response to the output port of the rectifier circuit.

According to another aspect of the present invention, a power converter apparatus is provided. The power converter apparatus comprises step down converter means for receiving a supply voltage and generating an output voltage at a magnitude that is lower than a magnitude of the supply voltage, the step down converter means including means for regulating the output voltage in response to a feedback signal; a DC/AC converter circuit of switching type having a primary side and a secondary side, the primary side having an input port coupled to the output port of the step-down converter circuit, the secondary side having an output port to provide an AC output voltage; a rectifier circuit having an input port and an output port, the input port being coupled to the secondary side of the DC/AC converter circuit, the output port supplying a DC voltage; and a feedback circuit to generate the feedback signal in response to the output port of the rectifier circuit.

According to another aspect of the present invention, a power converter apparatus is provided. The power converter apparatus comprises a step down converter means for receiving a supply voltage and generating an output voltage at a magnitude that is lower than a magnitude of the supply voltage, the step down converter means including means for regulating the output voltage in response to a feedback signal; a DC/AC converter means for receiving the output voltage of the step down converter means and providing an AC output voltage; a rectifier means for coupling to the secondary side of the DC/AC converter means and supplying a DC voltage; and a feedback means for receiving the DC output voltage of the rectifier means and generating the feedback signal supplied to the step down converter means.

According to another aspect of the present invention, a method for a power converter is provided. The method comprises: receiving a supply voltage and generating a first output voltage having a magnitude that is lower than a magnitude of the supply voltage, where the act of generating comprises regulating the first output voltage in response to a feedback signal; generating an AC voltage from the first output voltage; rectifying the AC voltage to provide a DC voltage; and generating the feedback signal in response to the DC voltage.

Notwithstanding the potential advantages of one or more embodiments of one or more aspects of the present invention, it should be understood that there is no requirement that any embodiment of any aspect of the present invention address the shortcomings of the prior art.

This invention and/or embodiments thereof will be more fully appreciated and understood from the accompanying detailed description in conjunction with the accompanying drawings.

DETAILED DESCRIPTION

Figure 1:
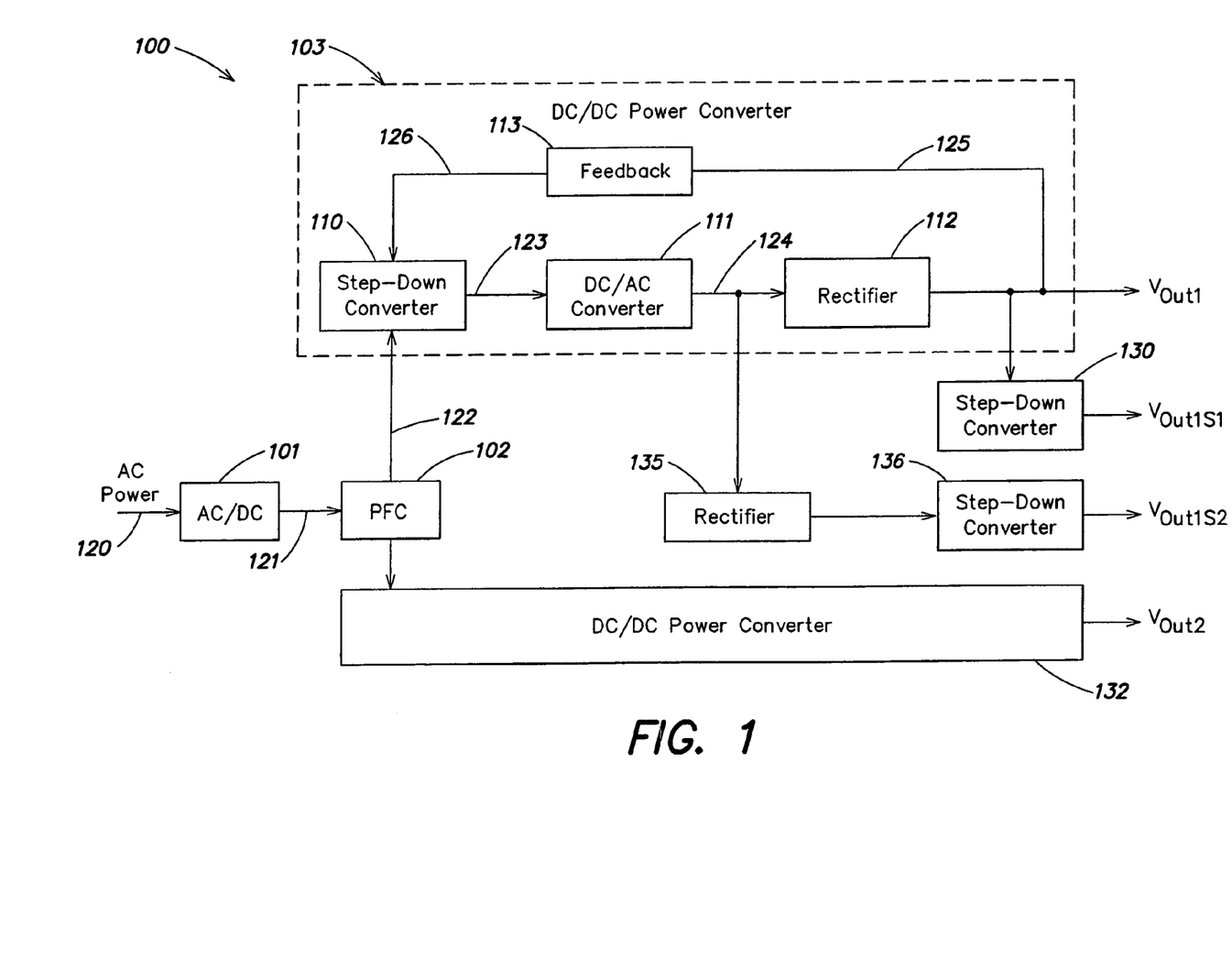
FIG. 1 is a block diagram of an AC/DC power supply that incorporates a DC/DC power converter according to one embodiment of the present invention.

FIG. 1 shows an AC/DC power supply 100 that incorporates a DC/DC power converter circuit in accordance with one embodiment of the present invention. The DC/DC power converter circuit of the present invention may be used by itself, as a DC/DC power supply, or may be combined with one or more other circuits in forming other types of power supply circuits, for example as shown in FIG. 1 to provide an AC/DC power supply.

The AC/DC power supply 100 has three stages: an AC/DC converter stage 101, a power factor control (PFC) stage 102, and a DC/DC converter stage 103. The DC/DC converter stage 103 includes a step-down converter circuit 110, a DC/AC converter circuit 111, a rectifier circuit 112 and a feedback circuit 113. The step down converter circuit 110 and the DC/AC converter circuit 111 are each switching type power converter circuits. As stated above, switching type power converter circuits make use of switches, as well as capacitors, inductors and/or transformers, to convert electrical power from one form to another.

In operation, AC power, provided from an AC supply (e.g., AC supply mains, not shown), is supplied via signal line(s) (represented by a signal line 120) to the AC/DC converter stage 101. The AC/DC converter stage 101 outputs a rectified voltage, which is supplied through signal line(s) (represented by a signal line 121) to the PFC stage 102. The PFC stage 102 applies power factor correction to raise the power factor of the AC/DC power supply circuit 100. If the power factor correction is ideal, then the power factor will reach unity and the AC/DC power supply will appear purely resistive to the AC supply mains. However ideal power factor correction may not be needed or obtained in all applications. The output of the PFC stage 102 is a regulated DC voltage, which is supplied through signal line(s) (represented by a signal line 122) to the step-down converter circuit 110 of the DC/DC converter stage 103. The step-down converter circuit 110 outputs a regulated DC voltage, the magnitude of which is lower than the magnitude of the voltage into the step-down converter circuit. The regulated DC voltage from the step-down converter circuit 110 is supplied through signal line(s) (represented by a signal line 123) to the DC/AC converter circuit 111. The DC/AC converter circuit 111 converts the regulated DC voltage to an AC voltage, which is supplied through signal lines 124 to the rectifier circuit 112. The rectifier circuit 112 generates a DC voltage, $V_{out1}$, which is the output voltage of the AC/DC power supply 100. The feedback circuit 113 receives the output voltage (through signal line(s) represented by a signal line 125) and supplies a feedback signal (through signal line(s) represented by a signal line 126) to the step-down converter circuit 110. The feedback signal is preferably an isolated feedback signal, although this is not a requirement. The step-down converter circuit 110 regulates its own output voltage such that the output voltage $V_{out1}$ has the desired magnitude.

As shown in FIG. 1, the output of the DC/DC power converter circuit 103 also may be supplied to another step-down converter circuit 130 to generate one or more auxiliary outputs, such as, for example, $V_{out1S1}$, although this is not required. Auxiliary outputs may also be provided by supplying the output of the DC/AC converter 111 to an additional rectifier circuit 135 that is in series with a step-down converter circuit 136.

The AC/DC power supply may be provided with one or more additional DC/DC power converter circuits, for example as indicated at 132, to generate additional DC output voltages, for example, such as $V_{out2}$. These additional DC/DC power converter circuits may be similar to the DC/DC power converter circuit 103 described above.

Figure 2:
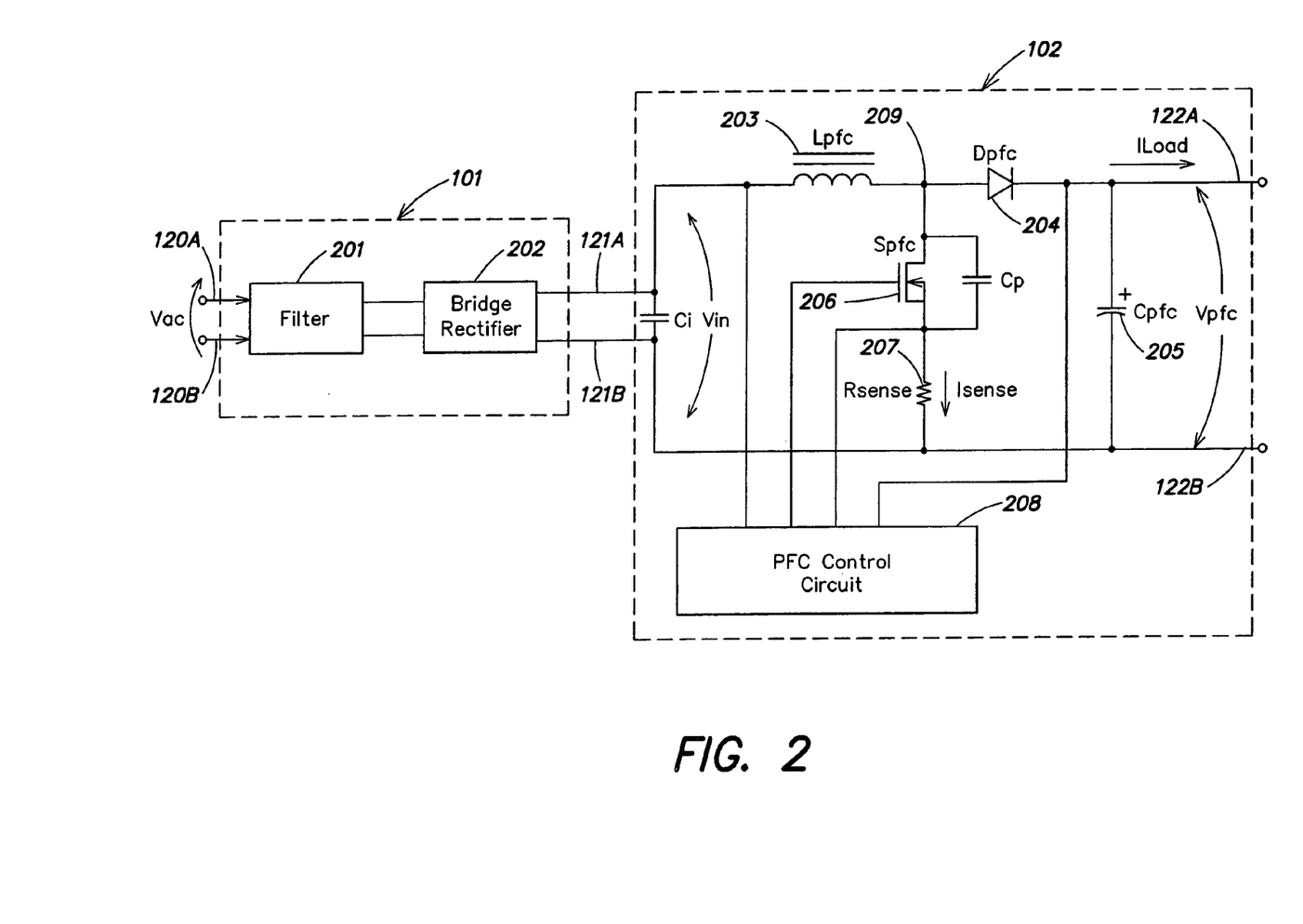
FIG. 2 is a diagram of one embodiment of the AC/DC and PFC stages of the AC/DC power converter circuit of FIG. 1.

FIG. 2 shows a further detail of one possible embodiment of the AC/DC and PFC stages 101, 102. The input to the AC/DC stage 101 is a voltage, $V_{ac}$, which is supplied through signal lines 120A, 120B. The output of the AC/DC stage 101 is $V_{in}$, which is supplied through signal lines 121A, 121B to the input port of the PFC stage 102. The output of the PFC stage 102 is an output voltage $V_{pfc}$, which is supplied through signal lines 122A, 122B.

In this embodiment, the AC/DC stage 101 includes an optional filter circuit 201 and a rectifier circuit 202. The optional filter circuit 201 comprises a conventional RF filter circuit. The rectifier circuit 202 has a bridge topology (not shown) to convert a sinusoidal signal to the full wave rectified signal, $V_{in}$.

The PFC stage 102 includes an inductor 203, a diode 204, a capacitor 205, a switch 206, a sense resistor 207 and a PFC control circuit 208. The capacitor 205 is connected across the output of the PFC stage 102 and supplies a current, $I_{load}$, to a load, which in some embodiments is constant, but is not limited to such. The inductor 203 and the diode 204 are connected in series with the capacitor 205. The switch 206 and a sense resistor $R_{sense}$ are connected in series between a terminal of the inductor 203 and the signal line 122B. As used herein, the term "terminal" includes leads and/or nodes.

The duty cycle of the switch 206 is controlled by the control circuit 208. In the on state, the switch 206 provides a shunt path (through the sense resistor $R_{sense}$) that causes an increase in the current in the inductor 203. In the off state, the current in the inductor relaxes (decreases). The control circuit 208 varies the duty cycle of the switch 206 based on the input voltage $V_{in}$ and average output current (which is determined indirectly based on variations in the output voltage $V_{pfc}$) to obtain a DC level at the output voltage $V_{pfc}$. If the load is constant, then the average current through the inductor 203 is equal to the load current $I_{load}$. As stated above, if the power factor correction is ideal, then the power factor will reach unity and the AC/DC power supply will appear purely resistive to the AC supply mains.

Figure 3:
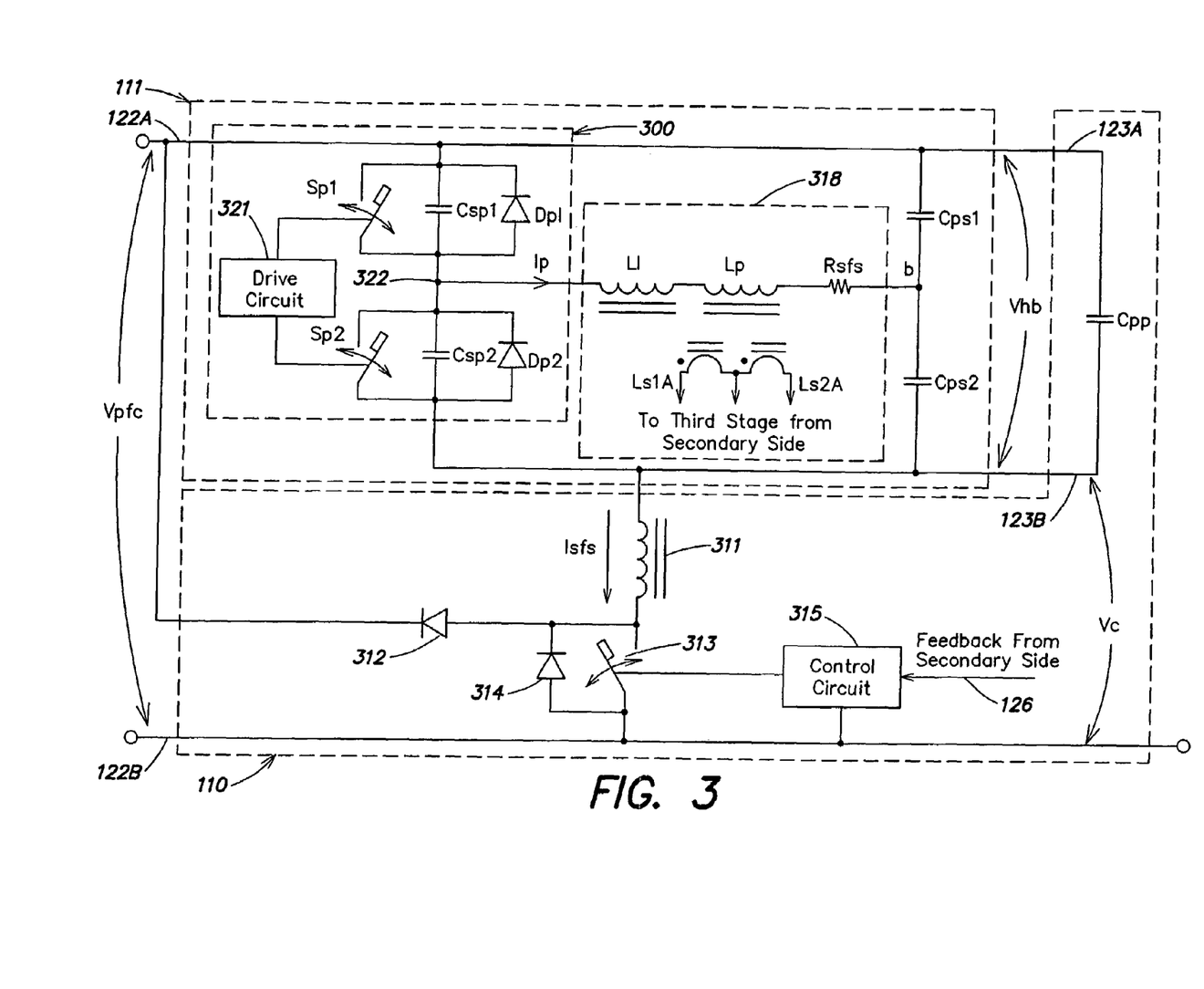
FIG. 3 is a schematic diagram of one embodiment of the step-down converter circuit and the DC/AC circuit of the DC/DC power converter circuit of FIG. 1.

FIG. 3 shows a schematic diagram of one embodiment of the step-down converter circuit 110 and the DC/AC converter circuit 111 of the DC/DC power converter circuit 103 (FIG. 1). In this embodiment, the step down converter circuit 110 includes an inductor 311, a diode 312, a switch 313, a control circuit 315 and a capacitor $C_{pp}$. The switch may, for example, comprise a transistor (e.g., an n-channel MOSFET) and an integral diode, represented by a diode $D_{p2}$. The input to the step-down converter circuit 110 is $V_{pfc}$ (i.e., the output of the PFC stage 102 (FIGS. 1, 2)). The output of the step-down converter circuit 110 is $V_{hb}$, which in this embodiment, appears across a capacitor $C_{pp}$.

A first terminal of the inductor 311 is coupled to a first terminal of the capacitor $C_{pp}$, a second terminal of which is coupled to the signal line 122A. The second terminal of the inductor 311 is coupled to a first terminal of the switch 313, a second terminal of which is coupled to the signal line 122B. The diode 312 couples the second terminal of the inductor to the signal line 122A. The control circuit 315 receives a feedback signal from the feedback circuit 113 (FIG. 1) and supplies a signal to control the state of the switch 313. The control circuit 315 may, for example, comprise an MC33364 manufactured by Motorola.

As used herein, the term "coupled to" includes connected directly to and connected indirectly to (i.e., through one or more elements).

In operation, the control circuit 315 varies the on/off frequency of the switch 313 based on the feedback signal, to thereby vary the voltage across the capacitor $C_{pp}$ so as to obtain the desired output voltage, $V_{OUT1}$, at the output of the DC/DC power converter circuit 103.

As stated previously, losses in a switch can be reduced by establishing a zero-voltage condition across a switch while the switch transitions from the off state to the on state. Consequently, some embodiments may include features to establish a zero (or near zero) voltage condition across the switch 313 at turn on of the switch. The phrase "turn on of the switch" refers to the instant at which the switch starts to transition from the off state to the on state. For example, in this embodiment, the step-down converter circuit 110 operates in a discontinuous mode in which the magnetic flux through the inductor 311 is periodically reset to 0. This is referred to as critical conduction mode. More particularly, the current through the inductor 311 rises while the switch 313 is in the on state, and resets to zero while the switch is in the off state. In addition, the voltage across capacitor $C_{pp}$, i.e., $V_{hb}$, is chosen to be at least ½ of $V_{pfc}$. For example, in this embodiment, $V_{hb}$ is chosen to be equal to about ¾ of $V_{pfc}$. The use of critical mode conduction in combination with the use of $V_{hb}$ greater than or equal to about ½ of $V_{pfc}$, results in a zero-voltage condition across the switch 313 at turn on of the switch 313. This helps minimize the losses in the switch 313.

Some embodiments may not provide zero-voltage switching but may nonetheless provide substantially zero volts switching. Substantially zero volts means that the voltage across the switch is less than or equal to 10% of the maximum voltage observed across the switch while the switch is in the off state. Note that if the integral diode across the switch is forward biased then the voltage across the switch will be clamped and will be substantially zero volts.

It should be understood that other embodiments need not use critical conduction mode. The step-down converter can work with fix frequency or variable frequency. If the fix frequency mode is chosen, then a frequency equal to the DC/AC converter or a multiple of this frequency is a good choice, in order to have less interference and audible noise between those to stages. The disadvantage of a fix frequency mode is that it cannot achieve zero voltage across the switch without special techniques.

The variable frequency mode which is also called the critical conduction mode is relatively straightforward to implement and may have a higher efficiency than the fixed frequency mode. One disadvantage however, is that the variable frequency mode may result in a large frequency variation (e.g. 200 KHz . . . 700 KHz) as the load changes from maximum to minimum. A large frequency variation can make it more difficult to compensate the loop to achieve stability across all line and load conditions.

The voltage $V_c$, which is a fraction of $V_{pfc}$, establishes the amount of energy available to supply to the load in the event that the AC power to the AC/DC power supply 100 is removed. Thus, in some embodiments, $V_c$, is selected so as to be able to provide a "hold up time" that is long enough for the system to perform any required maintenance prior to power down.

The DC/AC converter circuit 111 includes a bridge circuit 300, a transformer 318, and a capacitor assembly that includes capacitors $C_{ps1}$, $C_{ps2}$. The bridge circuit 300 includes a pair of switches $S_{p1}$, $S_{p2}$. Each of the switches may, for example, comprise a transistor (e.g., an n-channel MOSFET). In this embodiment, switch $S_{p1}$, has an integral diode, indicated at $D_{p1}$ and a parasitic capacitance, represented at $C_{sp1}$. Similarly, switch $S_{p2}$ has an integral diode, indicated at $D_{p2}$ and a parasitic capacitance, represented at $C_{sp2}$.

The bridge circuit 300 is coupled across the output of the step-down converter stage, which provides a voltage $V_{hb}$. More particularly, a first terminal of the bridge circuit 300 is coupled to the first terminal of the capacitor $C_{pp}$. A second terminal of the bridge circuit 300 is coupled to the second terminal of the capacitor $C_{pp}$.

The capacitors $C_{ps1}$, $C_{pS2}$ are connected in series with one another, the series combination being connected in parallel with the capacitor $C_{pp}$.

The transformer 318 includes a primary side winding, indicated at $L_p$, and two secondary side windings, indicated at $L_{s1A}$ and $L_{s2A}$. A leakage inductance $L_1$ and a resistance $R_{sfs}$ are also shown.

A first terminal of the primary side winding of the transformer 318 is coupled to an output of the bridge circuit 300. A terminal of the primary side winding is coupled to node "b" between the capacitors $C_{ps1}$ and $C_{pS2}$. The secondary windings provide the AC output voltage from the DC/AC converter circuit 111.

The DC/AC converter circuit further includes a control circuit 321 which supplies a respective control signal to each of the switches $S_{p1}$, $S_{p2}$. In this embodiment, the control signals each have a fixed frequency and a near 50% duty cycle. The term "duty cycle" refers to the on time (i.e., the amount of time that a switch is commanded to the on state) divided by the period of a switching cycle, i.e., $T_{on}/(T_{on}+T_{off})$. The phrase "near 50%" means greater than or equal to 40%. Note that the switches $S_{p1}$, $S_{p2}$ usually exhibit some amount of turn off delay, and therefore it may be desirable to keep the duty cycle less than or equal to 48%, so as to reduce the possibility of cross conduction (where switches $S_{p1}$, $S_{p2}$ are both on at the same time). The control circuit may be implemented in any manner. Some embodiments may use an MC34067 manufactured by Motorola, although this is not required for the present invention.

The duty cycle may be fixed, although this is not required. However, operating the DC/AC converter circuit at a fixed frequency and a fixed, near 50% duty cycle ratio helps reduce output ripple across the capacitor $C_{out}$. This in turn helps reduce the size of the smoothing filter, discussed below, and thereby helps improve efficiency and loop stability.

For purpose of the operational state analysis, it is assumed that the filter capacitor 309 is sufficiently large so that the voltage developed across the capacitor is approximately constant over the switching interval. The transformer 318 windings may have a coupling coefficient close to unity. The resulting leakage inductance is called $L_1$. The internal resistance of the primary winding is usually close to zero so it will be ignored. Furthermore it will be recognized that, while only a single output version is considered in this analysis, multiple output voltages may be obtained through the addition of windings, switches, synchronous rectifier gate drives, rectifier diodes and capacitors operated as herein to be described.

The operation of the circuits in FIG. 3 are further described below with respect to FIG. 4.

Figure 6:
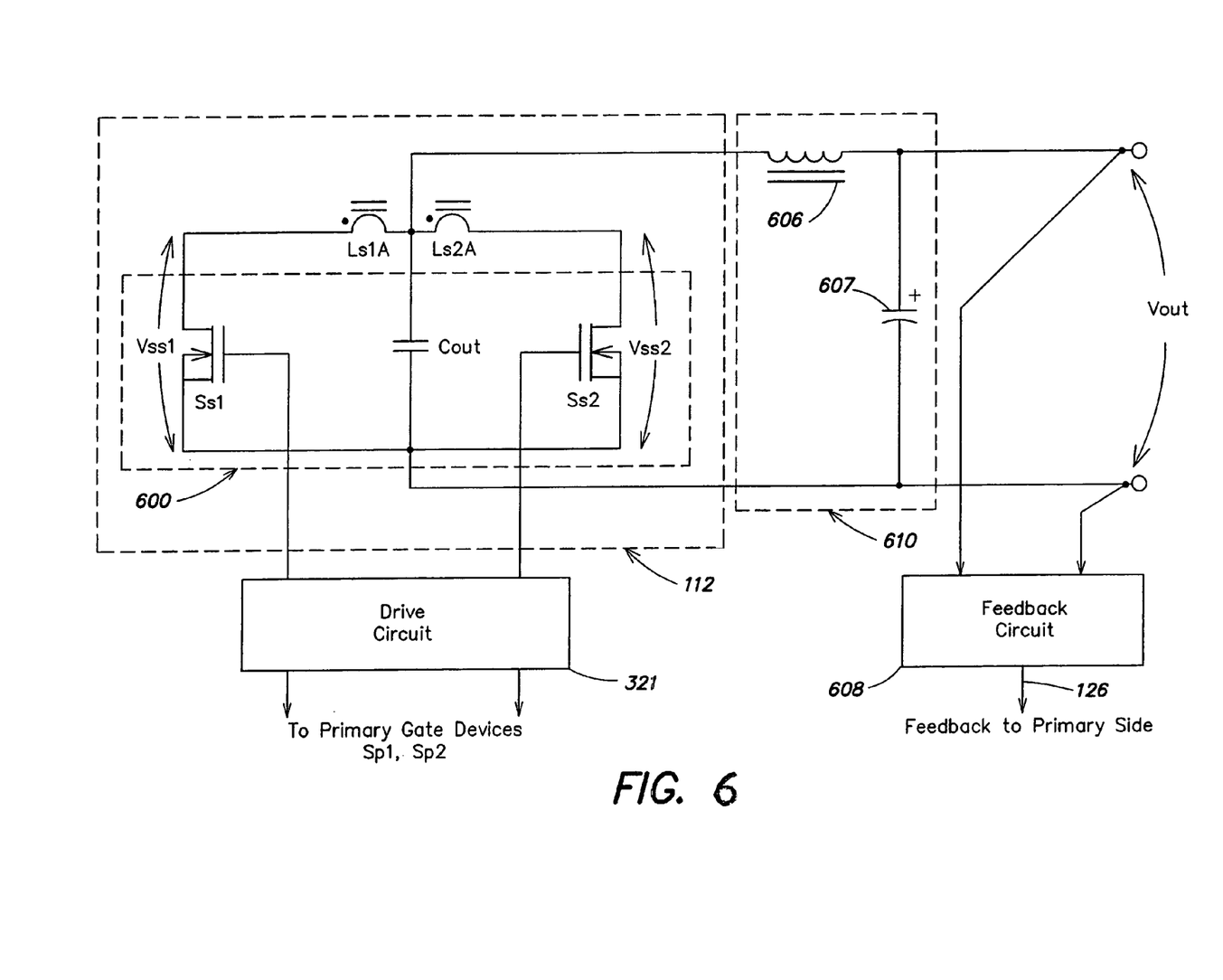
FIG. 6 is a schematic diagram of one embodiment of the third stage of the DC/DC power converter circuit of FIG. 1.

FIG. 6 shows one embodiment of the rectifier circuit 112 of the DC/DC power converter circuit 103 (FIG. 1). The rectifier circuit 112 includes a bridge circuit 600 and a capacitor $C_{out}$. The bridge circuit 600 includes two synchronous rectifier switching gate drive devices $S_{s1}$, $S_{s2}$. A first terminal of the switch $S_{s1}$ is coupled to a first terminal of the secondary $L_{s1A}$, a second terminal of which is coupled to a first terminal of the secondary $L_{s2A}$. A first terminal of the switch $S_{s2}$ is coupled to a second terminal of the secondary $L_{s2A}$. A first terminal of the capacitor $C_{out}$ is coupled to the center tap of the secondaries $L_{s1A}$, $L_{s2A}$. A second terminal of the switch $S_{s1}$ is coupled to a second terminal of the capacitor $C_{out}$ and to the second terminal of the switch $S_{s2}$.

In operation, the near 50% duty cycle ratio synchronuos gate drive circuit 412, operates the devices from the secondary side: $S_{s1}$, $S_{s2}$ substantially simultaneously with the devices on the primary side: $S_{p1}$, $S_{p2}$.

If synchronous gate drive switches are used in the rectifier's place within the third stage, a bidirectional power flow from primary side to secondary side and vice-versa is obtained due to the synchronization of the switching pairs ($S_{p1}$, $S_{s1}$) and ($S_{p2}$, $S_{s2}$). In this respect, if $V_{pfc}$ is zero and an external voltage is applied to the output ($V_{out}$), a proportional voltage ($V_{hb}$) will be found in the primary side.

FIG. 6 also shows the secondary windings $L_{s1A}$, $L_{s2A}$ from the DC/AC converter circuit 111 (FIG. 3), a feedback circuit 608, and an optional smoothing circuit 610. The feedback circuit 608 receives the output and supplies a feedback signal to the step-down converter stage 110 (FIG. 3). The optional smoothing circuit 610 includes a choke (inductor) 606 and a capacitor 607 that are connected in series between the center tap of the secondaries $L_{s1A}$, $L_{s2A}$ and the output of the bridge circuit 600. The capacitor 607 is coupled across the output, $V_{out}$.

It has been determined that the magnitude of the output filter choke 606 may be relatively small compared to that regularly used in power supply output stages. This is in part due to the near 50% duty cycle ratio employed in this embodiment of the DC/AC converter circuit. A small output filter choke has two potential advantages. First, it helps minimize the current path for high current outputs, thereby enhancing the overall efficiency. Second, it implies a small phase shift for the output filter, and therefore control loop stability and response is greatly enhanced.

In this embodiment, the impedance of the capacitor is relatively small compared to the impedance of the output filter choke 606. For example, $Z_c$ may be less than or equal to $Z_L/20$ at a frequency equal to 2 times the operating frequency of the DC/AC converter circuit. The output filter operates at two times the frequency of the DC/AC converter circuit because for each switching cycle of the DC/AC converter circuit, there are two switching cycles in the rectifier circuit (one cycle for each of $S_{s1}$ and $S_{s2}$).

Figure 4:
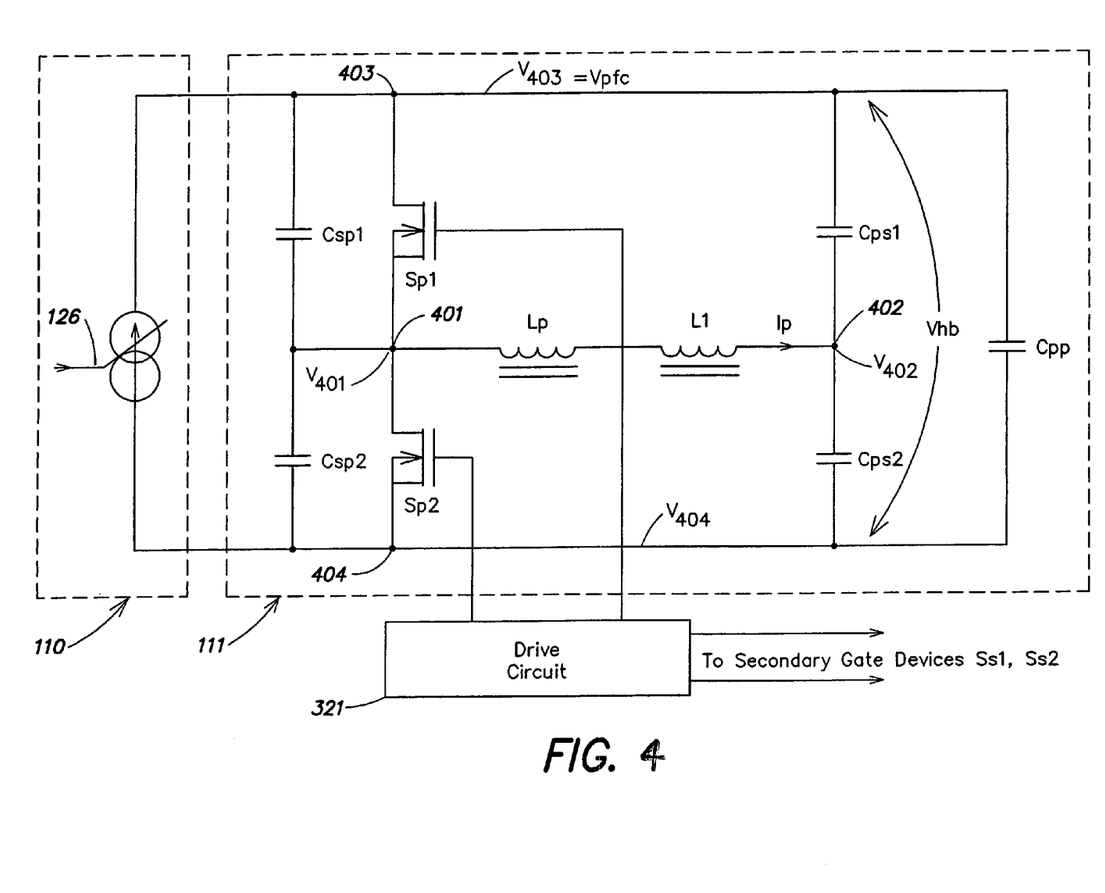
FIG. 4 shows a representation of an equivalent circuit (from an AC viewpoint) for the step-down converter circuit and the DC/AC converter circuit of FIG. 3.

FIG. 4 shows a representation of an equivalent circuit (from a dynamic or AC viewpoint) for the step-down converter circuit 110 and the DC/AC converter circuit 111 shown in FIG. 3. The equivalent circuit can be analyzed from this dynamic or AC point of view in terms of two states.

In a first state, one of the switches $S_{p1}$, $S_{p2}$ is in the on state. As to the primary side, there is a series circuit formed by: $L_1$ (the equivalent leakage inductance of the transformer 318), $L_p$ (the primary winding of the transformer 318) and an equivalent capacitor $C_{ps}$ having a value equal to the sum of $C_{ps1}$ and $C_{sp2}$. In this embodiment, the value of $C_{pp}$ is considerably larger than the value of $C_{ps}$ and the variation of the voltage across $C_{out}$ (at nominal current of the output) is relatively small comparing to the output voltage, during an interval of time equal to the sum of $T_{on}$ and $T_{off}$ (see FIG. 5). In addition, it has been assumed that the magnitude of the ripple voltage in point "b" 402 is small enough, compared to the magnitude of $V_{hb}$, to be ignored in this analysis, although the present invention is not limited to such.

As to the secondary side of the transformer 318, one of the rectifying switches $S_{s1}$ or $S_{s2}$ is also closed (see FIG. 6). As stated above, if the value of capacitor $C_{out}$ is large enough at the working frequency (of the DC/AC converter circuit), then one of the secondary windings $L_{s1A}$ or $L_{s2A}$ will be short circuited by the low impedance of capacitor $C_{out}$ from an AC point of view. Consequently, the primary winding $L_p$ will present an impedance that is almost zero. A series circuit is thus formed by the leakage inductance $L_1$ and $C_{ps}$.

As stated previously, losses in a switch can be reduced by establishing a zero-current condition while the switch transitions from the on state to the off state. As such, some embodiments may include features to establish a zero-current condition at turn off times of the switch. The phrase "turn off times of the switch" refers to the instant at which the switch starts to transition from the on state to the off state.

Some embodiments may not provide zero current switching but may nonetheless provide substantially minimum current switching. Substantially minimum current means that the current through the switch, at the instant that the switch is turned on, is less than or equal to 20% of the maximum current observed through the switch under nominal output power conditions.

In order to achieve a substantially minimum-current turn off for the switches, the relationship between the working frequency (F) of the DC/AC converter circuit and the value of the two mentioned components should be:

$$F = 1/(2*\pi*\sqrt{L1*Cps})$$

Figure 5:
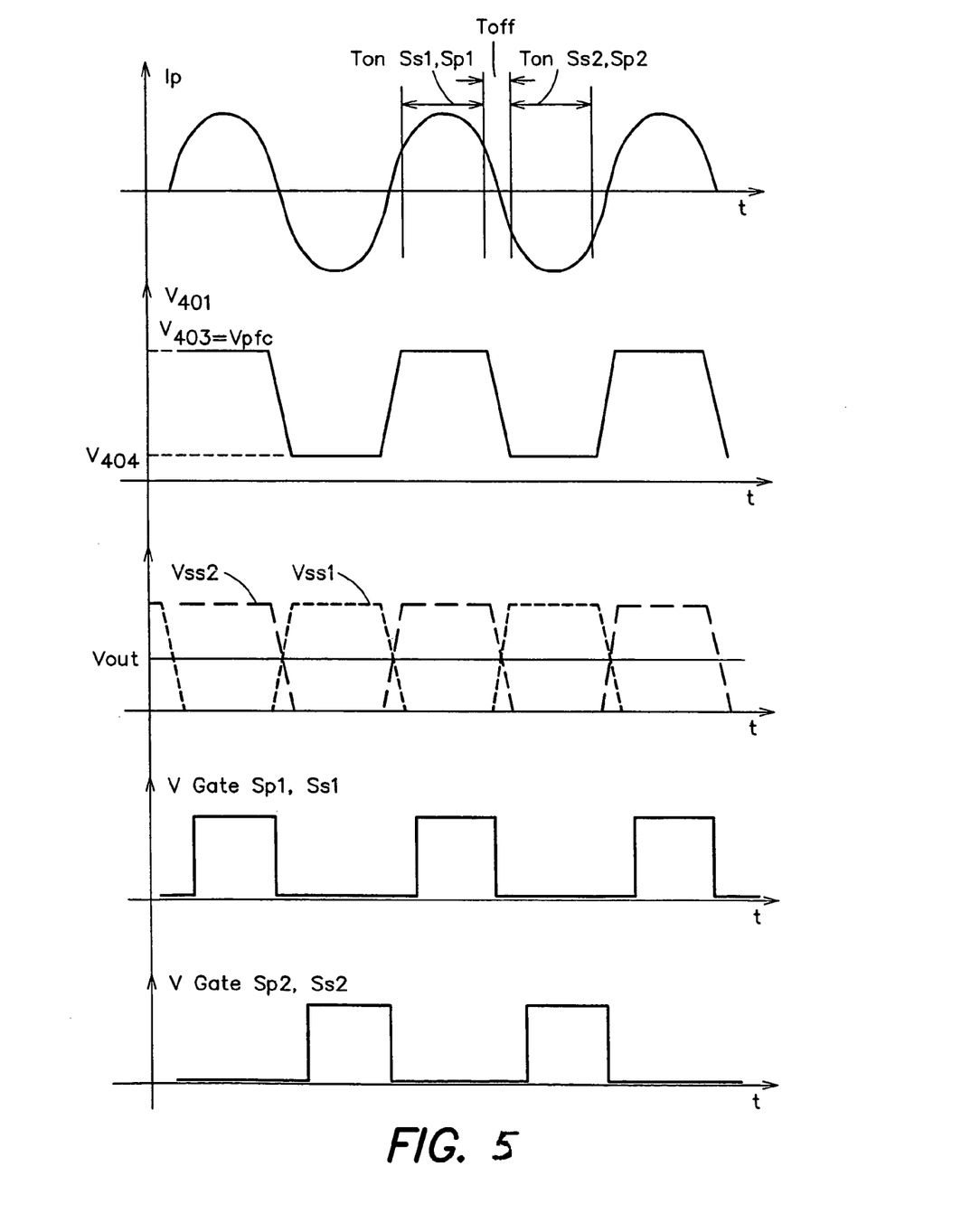
FIG. 5 shows signal timing waveforms for one embodiment of the DC/DC power converter circuit of FIG. 1.

The resulting timing for the current waveform in the primary winding of transformer 318 is shown in FIG. 5.

With the component values selected as described above, the frequency of the drive circuit 321 may be set equal to or approximately equal to the resonant frequency. Thereafter, in the operation of the circuit, the drive circuit 321 turns the switches off and on at the resonant frequency and the desired resonant behavior is automatically provided by the circuit. As a result, at the moment that a switch on the primary side is turned off, the current through that particular switch is at its minimum value. Note that in this embodiment, this current is not equal to zero. Because the current on the secondary side is related to the current on the primary side, the current on the secondary side is also at its minimum.

In a second state, both $S_{p1}$ and $S_{p2}$ are open. In order to reduce losses when one of the above switches is going to be turned ON, a zero-voltage condition on that switch is desired at the turn on time. This condition can be fulfilled if:

(1) There is enough magnetizing energy stored in the primary transformer winding $L_p$ during a conduction period of time (marked as Ton in FIG. 5) in order to modify the potential of point "a" (401) from the potential at node "c" (403) to the potential at node "d" (404) or vice-versa, and (2) There is enough dead time (marked as $T_{off}$ in FIG. 5) between the moment when one of the switches $S_{p1}$ or $S_{p2}$ goes off and the other one goes on, to get a zero-voltage condition at the turn on time.

These two conditions can be reformulated in the following way:

$$T = 2*(Ton+Toff)$$

$$Csp = Csp1 + Csp2$$

$$Cps = Cps1 + Cps2$$

The magnetizing value of the current through $L_p$ at the end of the conduction period (Ton) is:

$$Ipmag = Vhb/Lp*Ton$$

During $T_{off}$, a resonant circuit is formed by $L_p$ and the parasitic capacitors connected to node "a" (401), referred to as $C_{sp}$. The magnetizing energy of $L_p$ is transferred to $C_{sp}$ and from the equivalence of the energies we have the following formula:

$$Lp*Ipmag^2/2 \geq Csp*Vhb^2/2$$

$$Lp \leq Ton^2/Csp$$

$$Toff \geq \frac{1}{2}*2*\pi*\sqrt{Lp*Csp}$$

$$Lp \leq Toff^2/(\pi^2*Csp)$$

Based on the above relations, we can estimate the values for the $L_p$, $L_1$, $T_{on}$ and $T_{off}$.

Zero voltage switching is achieved as a result of transferring the magnetic energy to the parasitic capacitance at node "a" as follows. First, due to the symmetrical switching waveform, it can be assumed that the DC voltage across $C_{ps1}$ and $C_{ps2}$ are equal to another. Thus, the potential of node "b" is approximately ½ of $V_{hb}$ (as measured against node "c"). Furthermore, assuming that $S_{p2}$ is on, the voltage on node "a" is zero relative to node "c". The current in $S_{p2}$ ramps up and the magnetic energy in the core increases accordingly. If $S_{p2}$ is turned off, then the magnetizing energy stored in the primary of the transformer is delivered to node "a" until the potential of point "d" is reached. With the potential at node "a" equal to the potential of node "d", the voltage across $S_{p1}$ is zero.

To get the desired amount of energy delivered to node "a", the value of the inductance is chosen in relation to the total equivalent capacitance at node "a" measured against node "c". In practice, the value of the inductance is typically chosen to be no greater than the critical value so as to make sure that the potential of node "a" moves fully from the potential at node "c" to the potential at node "d", or vice versa. If the energy is at the critical value then the integral diodes will not be forward biased. If the energy is greater than the critical value, then the integral diodes will become forward biased and clamp the voltage. The off time (dead time) should be larger than the amount of time needed to transfer the magnetizing energy from the transformer into the parasitic capacitors connected to node "a" (for example the parasitic capacitors of the switches). However, the greater the energy, the less time is needed to move the potential at node "a" from the potential at node "c" to the potential of node "d" or vice versa. Thus, the off time may be reduced.

In order to improve manufacturability, it may be desirable to add additional capacitance to node "a" so that any variations in the capacitance of the parasitic capacitors will be small compared to the overall value of capacitance connected to node "a". Note that another practical issue with respect to parasitic capacitors of the switches (especially MOSFET devices) is that they are often dependent on the applied voltage. Adding additional capacitance to node "a" allows accurate control of the voltage change observed on node "a".

The above analysis has deliberately ignored the energy that is stored in the leakage inductance. This energy is proportional with the power transferred through the transformer 318 and is relevant for the analysis of the second state (i.e., where both $S_{p1}$ and $S_{p2}$ are open), where this energy is to be added to the magnetizing energy of the transformer. If the resonance condition of the series circuit mentioned above is fulfilled, then this energy is small compared to the chosen magnetizing energy, at the end of a conduction cycle (the current $I_p$ is almost zero). If the circuit is out of resonance, then this additional energy will speed up the transitions of node "a", between the potentials of nodes "c" and "d". In this case, a circuit that will dynamically modify the $T_{off}$ time accordingly to the load can be used to enhance the overall timing and finally the efficiency.

Another possible approach is to remove the capacitor $C_{pp}$ and synchronize the near 50% duty cycle drive circuit that is working at frequency F with the step-down converter circuit that can work at the frequency F or multiples of F in order to get a noiseless conversion. This approach may improve the overall response of the feedback loop, although operating the step-down converter at a fixed frequency may make it more difficult to achieve a zero-voltage condition across the switching element 313.

Some embodiments employ a single equivalent capacitor in place of the capacitors $C_{ps1}$, $C_{ps2}$. The single equivalent capacitor may be connected between the primary of the transformer and either of signal lines 123A, 123B (FIG. 3). However, the use of both of the capacitors $C_{ps1}$, $C_{ps2}$ helps optimize the response of the loop with respect to large transitions in the load current.

FIG. 5 shows signal timing waveforms for one embodiment operating with a near 50% duty cycle ratio and in a substantially minimum current (note that "zero-current" may be ideal but may not achieved in this particular embodiment) resonant mode. The waveforms include waveforms for $I_p$ (representing the current through the primary without the magnetizing component), $V_a$ (the voltage at node "a" 401 measured with respect to the signal line 122B), $V_{ss1}$ and $V_{ss2}$ (the voltage across the switches in the rectifier circuit), $V_{gate\ sp1,\ ss1}$ (the control signal applied to the switches $S_{p1}$ and $S_{p2}$) and $V_{gate\ Sp2,\ Ss2}$ (the control signal applied to the switches $S_{s1}$, $S_{s2}$).

Some embodiments may provide soft starting, under/over-voltage protection and/or current limiting. Such features can be provided in any of various ways. For example, for soft starting, the duty cycle for the switch 313 may be limited to a low value at power up and then allowed to increase to its steady state value. Alternatively, if the feedback circuit 608 uses an internal reference, that reference may be limited to a low value at power up and then allowed to increase to its steady state value. Over-voltage may be handled as follows. If an over-voltage condition is detected, the control circuit 315 may cease to turn off the switch 313. This causes the output voltage to decrease to 0. In some embodiments, the output voltage remains at 0 until the unit is cut off from the AC mains and then reconnected. As to current limiting, if the feedback circuit 608 detects that the current through the load has reach its maximum allowable value, the feedback signal to the control circuit 315 may be modified as appropriate, in order to limit the average current through the inductor $L_{fs}$ to a value that corresponds to a maximum load current desired in the secondary side. The output voltage decreases accordingly.

Figure 7:
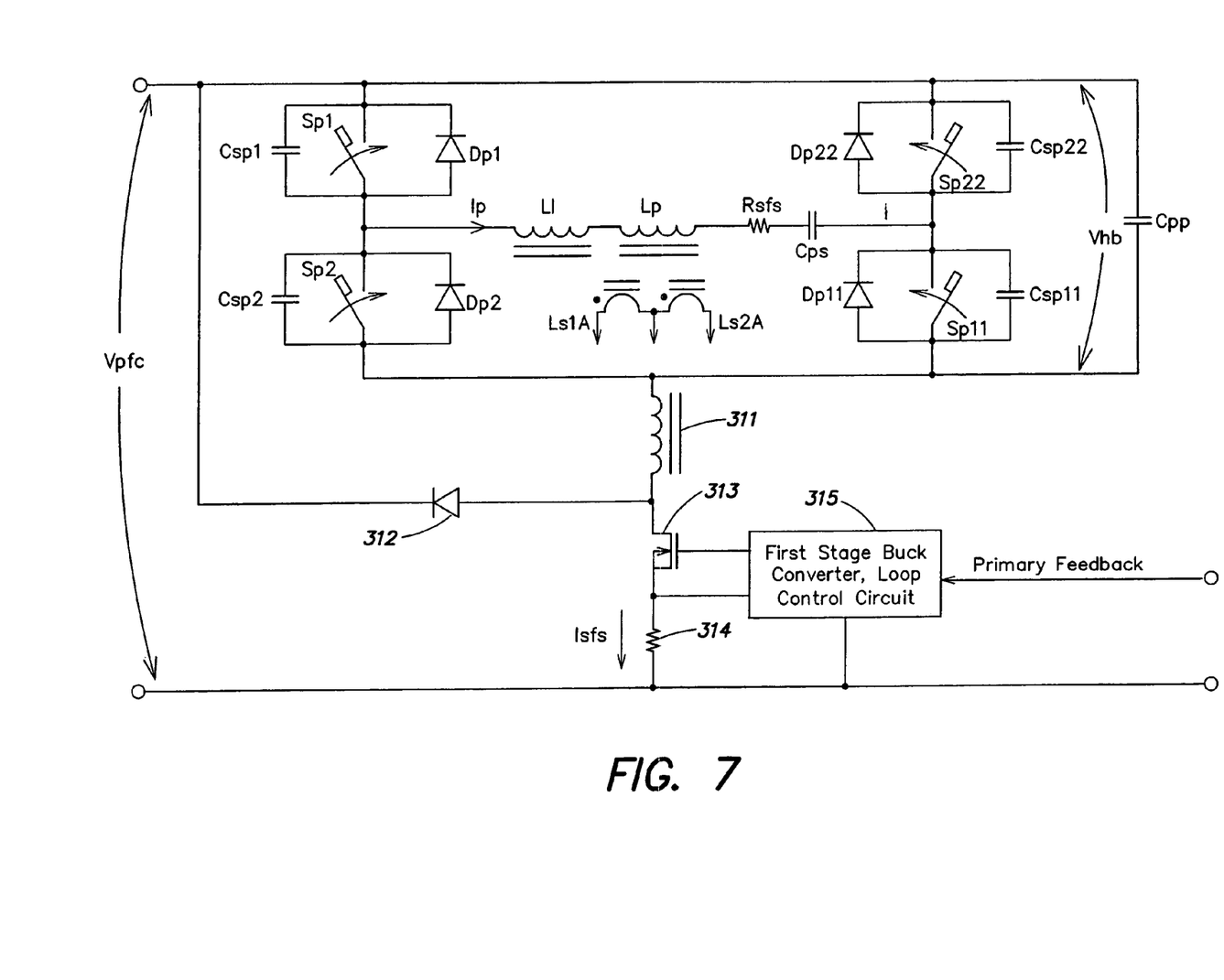
FIG. 7 is a schematic diagram of another embodiment of the first and second stages of the DC/DC power converter circuit of FIG. 1.
Figure 8:
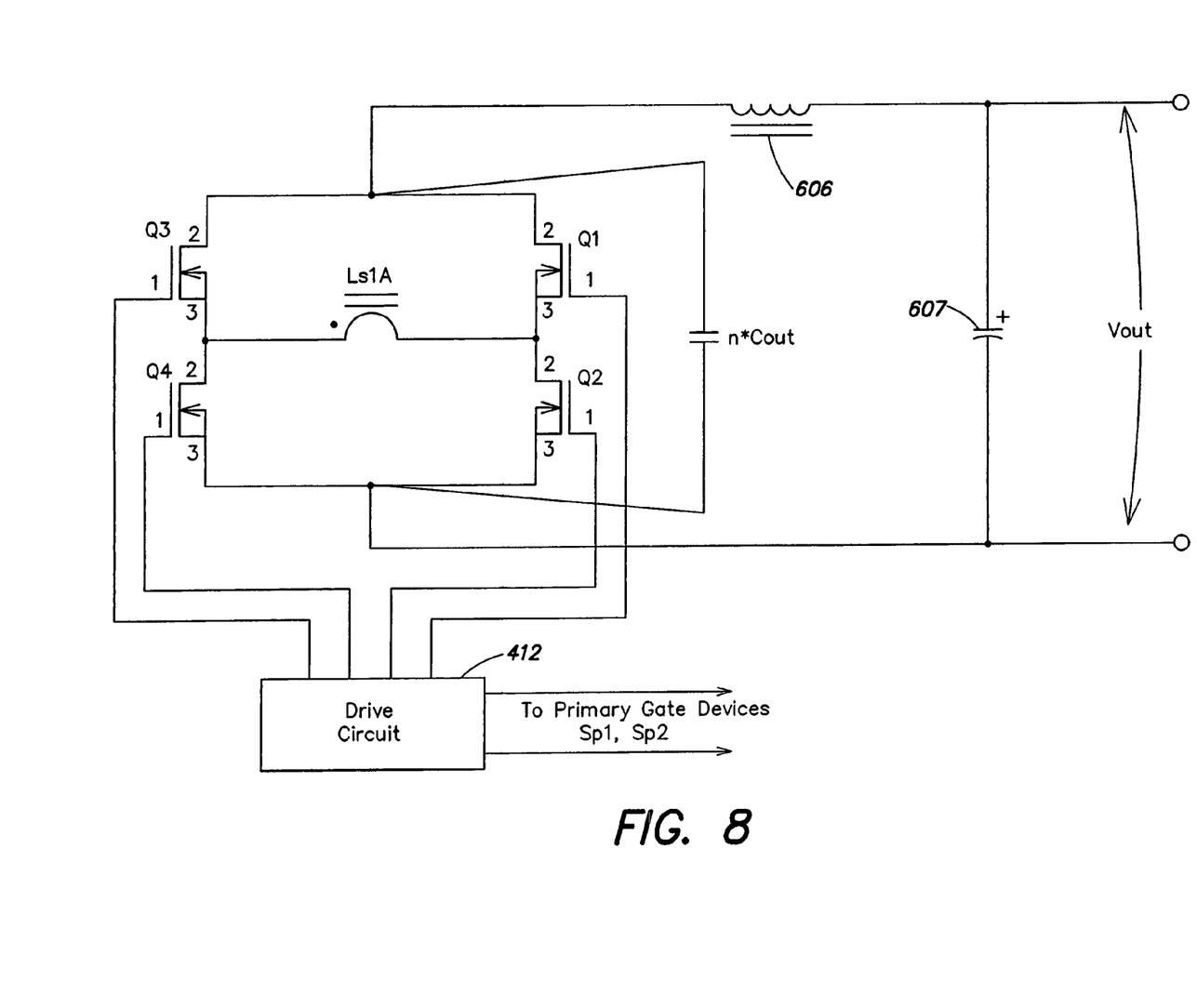
FIG. 8 is a schematic diagram of another embodiment of the third stage of the DC/DC power converter circuit of FIG. 1.

FIGS. 7–8 show alternative embodiments for the step-down converter circuit, the DC/AC converter circuit, and the rectifier circuit. In these embodiments, the DC/AC converter circuit and the rectifier circuit each employ a full wave bridge configuration. Note that the DC/AC converter circuit and the rectifier circuit shown in FIGS. 3, 6 employ half wave configurations. A full wave configuration may provide advantages when operating at higher output powers, where there are smaller currents ($I_p$/2) through switches and the primary transformer's winding, although the full wave configuration may require a higher number of components and a more complicated control drive circuit, as compared to the half wave configuration.

Some embodiments of one or more aspects of the present invention may operate in a frequency range between 10 KHz and 1 MHz.

Although disclosed above with respect to an embodiment that incorporates various features that alone or in combination with one other may help reduce cost and improve efficiency and/or reliability, it should be understood that the present invention is not limited to such. For example, there is no requirement to employ power factor correction or zero-voltage and zero-current switching. In addition, there is no requirement to operate the DC/AC converter circuit and the rectifier circuit at a fixed frequency and fixed duty cycle near 50%. Nor is there any requirement to use a small output filter choke. Furthermore, while the embodiments disclosed above do not employ snubber circuits, there is no prohibition against such circuits. Moreover, although some features and techniques are described as optional, this is not meant to imply that all other features and techniques are required, i.e., not optional.

Note that, except where otherwise stated, terms such as, for example, "comprises", "has", "includes" and all forms thereof, are considered open-ended so as not to precluded additional elements and/or features.

Also note, except where otherwise stated, phrase such as, for example, "in response to", "based on" and "in accordance with" mean "in response at least to", "based at least on" and "in accordance with at least", respectively, so as, for example, not to preclude being responsive to, based on, or in accordance with more than one thing.

As used herein, a "port" has one or more leads or nodes, but is not otherwise limited to any particular structure.

While there have been shown and described various embodiments, it will be understood by those skilled in the art that the present invention is not limited to such embodiments, which have been presented by way of example only, and that various changes and modifications may be made without departing from the spirit and scope of the invention. Accordingly, the invention is limited only by the appended claims and equivalents thereto.

What is claimed is:

1. Power converter apparatus comprising:
a step-down converter circuit of switching type having an input port to couple to a supply voltage and having an output port to provide an output voltage at a magnitude that is lower than a magnitude of the supply voltage, and having a control circuit to receive a feedback signal and regulate the magnitude of the output voltage in response thereto;
a DC/AC converter circuit of switching type having a primary side and a secondary side, the primary side having an input port coupled to the output port of the step-down converter circuit, the secondary side having an output port to provide an AC output voltage;
a rectifier circuit having an input port and an output port, the input port being coupled to the secondary side of the DC/AC converter circuit, the output port supplying a DC voltage; and
a feedback circuit to generate the feedback signal in response to the output port of the rectifier circuit.

* * * * *